US009375860B2

(12) United States Patent
Grisley (10) Patent No.: US 9,375,860 B2
(45) Date of Patent: Jun. 28, 2016

(54) ADJUSTABLE GUIDEBUSHES

(75) Inventor: Kenneth M. Grisley, Port Coquitlam (CA)

(73) Assignee: Leigh Industries, Ltd. (CA)

( * ) Notice: Subject to any disclaimer, the term of this patent is extended or adjusted under 35 U.S.C. 154(b) by 829 days.

(21) Appl. No.: 13/566,345

(22) Filed: Aug. 3, 2012

(65) Prior Publication Data

US 2012/0291920 A1 Nov. 22, 2012

Related U.S. Application Data

(62) Division of application No. 11/942,131, filed on Nov. 19, 2007, now Pat. No. 8,256,475.

(60) Provisional application No. 60/860,167, filed on Nov. 20, 2006.

(51) Int. Cl.
*B27C 5/10* (2006.01)
*B23Q 9/00* (2006.01)
*B23Q 16/02* (2006.01)
(Continued)

(52) U.S. Cl.
CPC ............... *B27C 5/10* (2013.01); *B23Q 9/0042* (2013.01); *B23Q 16/024* (2013.01); *B23Q 35/26* (2013.01); *B27F 1/12* (2013.01)

(58) Field of Classification Search
CPC .......... B27C 5/10; B23Q 33/00; B23Q 35/04; B23Q 35/08; B23Q 35/10; B23Q 35/26; B23Q 16/024; B23Q 9/0042; B23Q 9/0014; B23Q 9/0078; B23Q 9/0085; B23Q 9/0092; B23B 13/126; B23B 49/02; B23B 49/023; B23B 49/04; B27F 1/12; B27F 5/023

USPC ......... 144/344, 345, 347, 354, 355, 360, 371, 144/372; 409/131, 132
See application file for complete search history.

(56) References Cited

U.S. PATENT DOCUMENTS 1,270,144 A * 6/1918 Gallimore ............ B23Q 27/006
408/241 R
2,424,485 A * 7/1947 Miller .................... B23B 49/02
33/DIG. 8

(Continued)

FOREIGN PATENT DOCUMENTS

EP 0513322 6/1992
GB 2443974 7/2009
(Continued)

OTHER PUBLICATIONS

Combined Search and Examination Report for British Application No. GB0722747.3 issued by the UK Patent on Mar. 5, 2008.
(Continued)

*Primary Examiner* — Alexander P Taousakis
*Assistant Examiner* — Leonel Vasquez
(74) *Attorney, Agent, or Firm* — Kilpatrick Townsend & Stockton LLP (57) ABSTRACT

Adjustable guidebushes and methods for using the same facilitate cutting joint elements into work-pieces to join together two or more of the work-pieces. In some embodiments, the adjustable guidebush includes a guide surface defining a number of outer diameters having different lengths. Positioning different outer diameters of the guide surface to interact with a cutting guide allows one to adjust the fit of the joint elements formed in the work-pieces.

15 Claims, 7 Drawing Sheets

(51) Int. Cl.
*B23Q 35/26* (2006.01)
*B27F 1/12* (2006.01)

(56) References Cited

U.S. PATENT DOCUMENTS

| | | | |
|---|---|---|---|
| 2,497,679 A | 2/1950 | Maples | |
| 2,717,013 A | 9/1955 | Zwalenburg | |
| 2,881,644 A * | 4/1959 | Conner | B23B 49/023 408/241 R |
| 3,109,466 A | 11/1963 | Jones | |
| 3,228,271 A | 1/1966 | Fluskey | |
| 3,606,566 A * | 9/1971 | Bethke | B23B 49/023 408/241 R |
| 3,800,840 A | 4/1974 | McCord, Jr. | |
| 3,834,435 A | 9/1974 | McCord, Jr. | |
| 3,878,875 A | 4/1975 | McCord, Jr. | |
| 4,299,293 A | 11/1981 | Nikolaev et al. | |
| 4,428,408 A | 1/1984 | Grisley | |
| 4,669,926 A * | 6/1987 | Wilcox, Jr. | B23B 47/281 269/87.3 |
| 4,733,996 A * | 3/1988 | Catapano | B23B 47/28 408/115 R |
| 4,750,536 A | 6/1988 | Grisley | |
| 4,780,032 A | 10/1988 | Uyeda et al. | |
| 4,787,432 A | 11/1988 | Williams | |
| 5,101,875 A * | 4/1992 | Eckhold | B23Q 9/0014 144/136.95 |
| 5,114,265 A * | 5/1992 | Grisley | B27F 1/12 144/144.1 |
| 5,123,463 A | 6/1992 | Grisley | |
| 5,289,861 A | 3/1994 | Hedrick | |
| 5,293,915 A * | 3/1994 | Fuchs et al. | 144/154.5 |
| 5,423,357 A | 6/1995 | Szymanski | |
| 5,542,324 A | 8/1996 | Hormannsdorfer | |
| 5,584,328 A | 12/1996 | Grisley | |
| 5,664,913 A | 9/1997 | Scholz | |
| 5,711,356 A | 1/1998 | Grisley | |
| 5,716,360 A | 2/1998 | Baldwin et al. | |
| 5,730,560 A * | 3/1998 | Marcelloni | B23B 49/023 408/115 B |
| 5,983,968 A | 11/1999 | Newman | |
| 6,116,303 A | 9/2000 | Hampton | |
| 6,604,895 B1 | 8/2003 | Schroeder | |
| D488,696 S * | 4/2004 | Merritt | D8/70 |
| 6,736,173 B1 | 5/2004 | Grisley et al. | |
| 7,089,978 B2 | 8/2006 | Karkosch et al. | |
| 7,207,361 B1 * | 4/2007 | Vice | B27C 5/10 144/136.95 |
| 7,273,080 B2 | 9/2007 | Baber | |
| 7,455,089 B2 | 11/2008 | McDaniel et al. | |
| 8,256,475 B2 * | 9/2012 | Grisley | B23Q 9/0042 144/144.1 |
| 2006/0021676 A1 * | 2/2006 | McDaniel | B27C 5/10 144/144.1 |

FOREIGN PATENT DOCUMENTS

| | | |
|---|---|---|
| SU | 448128 | 10/1974 |
| SU | 931326 | 5/1982 |
| SU | 1553283 | 3/1990 |
| WO | WO-92/10330 | 6/1992 |

OTHER PUBLICATIONS

GB0722747.3 Response to Office Action dated Nov. 17, 2008.
GB0722747.3 Second Office Action dated Jan. 5, 2009.
GB0722747.3 Response to Second Office Action dated Feb. 10, 2009.
GB0722747.3 Third Office Action dated Mar. 25, 2009.
GB0722747,3 Response to Third Office Action dated May 14, 2009.
GB0722747.3 Notification of Grant dated Jun. 16, 2009.
Notice of Allowance in Related U.S. Appl. No. 11/942,131 dated May 11, 2012, 15 pages.

* cited by examiner

ADJUSTABLE GUIDEBUSHES

RELATED APPLICATIONS

This application is a division of U.S. application Ser. No. 11/942,131, filed Nov. 19, 2007 for "Adjustable Guidebushes," which claims the benefit of U.S. Provisional Application Ser. No. 60/860,167, filed Nov. 20, 2006 for "Various Attachments and Accessories for Use with Cutting Templates and Methods for Using the Same," the entire contents of both of which are hereby incorporated by this reference.

RELATED FIELDS

Embodiments of the present invention relate to adjustable guidebushes for guiding the movement of a cutter with respect to a work-piece.

BACKGROUND

Routers and other cutting tools are often used with cutting guides that guide the movement of the tool's cutter with respect to a work-piece, such as a piece of wood. For instance, U.S. Pat. No. 4,428,408 for a "Dovetailing Jig" discloses one type of a cutting guide that includes a plurality of moveable guide fingers that provide guide surfaces for facilitating cutting joint elements into work-pieces. The guide fingers interact with a guidebush attached to the cutting tool to guide the movement of the tool's cutter during the cutting procedure. The guidebush may surround the cutter and include an outer guide surface that interacts with surfaces on the guide fingers to guide the cutter's movement. Using these or other types of cutting guide and cutting tool systems helps one accurately and relatively quickly cut a wide variety of joint elements or make other types of cuts in a work-piece, including, but not limited to, box joints, finger joints, dovetail joints (including through, half-blind, and sliding dovetails), and mortise and tenon joints.

Often, it is desirable to adjust the tightness of the fit between joint elements cut using a cutting guide and cutting tool system. Manufacturing variance in cutting guide, guidebush, and cutter dimensions, as well as shaft/bearing wear ("run out") in the cutting tool, may result in joint elements that fit too loosely or tightly.

One known method for adjusting the fit of a joint is to switch the cutting tool's guidebush for a different guidebush having either a larger or smaller outside diameter, which may result in a tighter or looser fit. Such a method, however, may not allow for precise adjustment of the joint's fit, since the range and increments of adjustment will be limited by the number of guidebushes in the user's possession. Also undesirably, exchanging the guidebush on the cutting tool for a different guidebush may require the removal of the cutter from the cutting tool (such as with dovetail cutters), and could require additional trial and error to reset the correct cutter depth setting.

Another known device and method for adjusting joint fit is disclosed in U.S. Pat. No. 5,584,328 for a "Guidebush Assembly For Use With A Finger Joint Template." The guidebush disclosed in the '328 Patent includes a tapered guide surface, with the lower diameter of the guidebush being smaller than the upper diameter. The guidebush is mounted on a router base in a rotating fashion such that rotating the guidebush in one direction raises it and rotating the guidebush in another direction lowers it. Because the guidebush has a tapered guide surface, raising and lowering the guidebush changes the "effective diameter" of the guidebush (the diameter of the guidebush where it contacts the template), and consequently allows the fit of the joint to be tightened or loosened.

Guidebushes with tapered guide surfaces, such as the guidebushes disclosed in the '328 Patent, may be relatively difficult and time-consuming to manufacture.

SUMMARY

Adjustable guidebushes of the present invention, like the adjustable guidebushes disclosed in the '328 Patent, may include guide surfaces that allow for multiple effective diameters. Unlike the '328 Patent guidebushes, however, adjustable guidebushes of the present invention do not necessarily include a tapered guide surface. Rather, these guidebushes, in some embodiments, may include a non-circular outer guide surface, such as an oval guide surface, which may be rotated relative to a cutting guide to vary the effective diameter of the guidebush that is presented to the cutting guide.

Some embodiments of adjustable guidebushes that include a non-circular guide surface, rather than a tapered guide surface, may be easier to manufacture. For instance, a non-circular guide surface may be formed using a casting process, rather than a machining process.

In some embodiments, the adjustable guidebush may be attached to a router or other cutting tool to help guide the tool's movement with respect to a cutting guide. The adjustable guidebush may include a guide member, which may include an outer guide surface and a through-bore. The tool's cutter may pass through the through-bore and the guide surface may interact with a cutting guide surface to help guide the tool's movement. In some embodiments, the walls of the guide surface may be parallel to the axis of the through-bore (e.g., in some embodiments, not tapered), and may define at least two different outer diameters. For instance, in some embodiments, the cross-section of the guide surface may be at least slightly oval shaped, such that rotating the guidebush guide surface with respect to the cutting guide changes the "effective diameter" of the guidebush by aligning different diameters of the oval guide surface with the guide surfaces of the cutting guide.

DETAILED DESCRIPTION OF DRAWINGS

Figure 1:
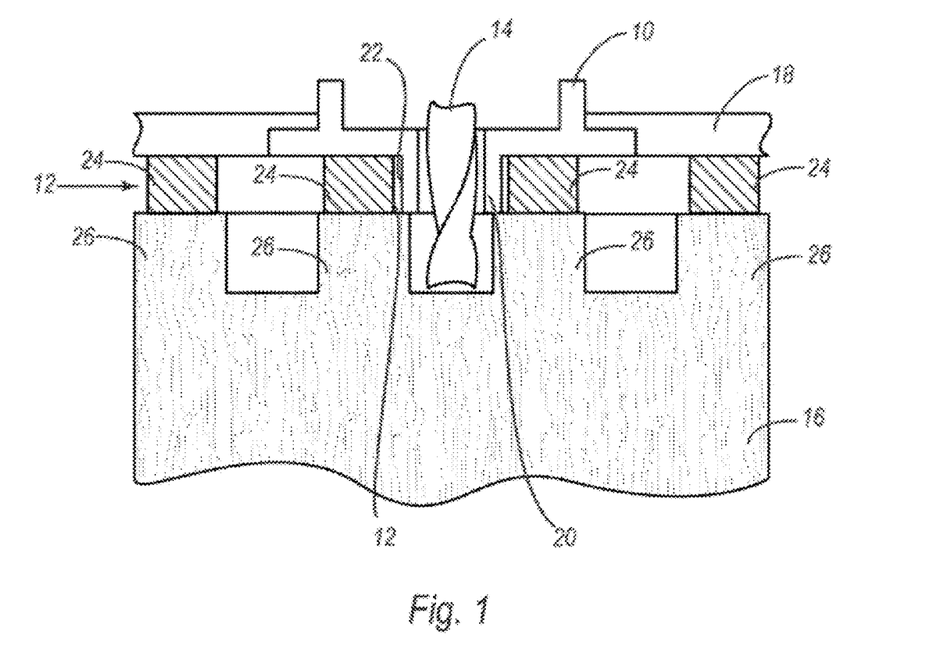
FIG. 1 is a schematic, fragmentary, not to scale, cross section of one embodiment of an adjustable guidebush and a cutting guide for guiding the movements of a cutter with respect to a work-piece.

FIG. 1 schematically illustrates one embodiment of an adjustable guidebush 10 of the present invention, although other embodiments of adjustable guidebushes are also possible and within the scope of the present invention. The adjustable guidebush 10 shown in FIG. 1 is secured to the base 18 of a cutting tool (in this embodiment, a router), and interacts with a cutting guide 12 to guide the movement of a cutter 14 with respect to a work-piece 16. The cutter 14 shown in FIG. 1 is a spiral-cut router bit, which is rotated by the router. In other embodiments, other types of router bits, or other types of cutters, whether cutters used with a router or some other type of cutting tool, may be used with the adjustable guidebush 10.

In the embodiment shown in FIG. 1, the adjustable guidebush 10 includes a guide member 20, having an outer guide surface 22. The guide surface 22 may interact with surfaces on the cutting guide 12 to limit the movement of the router, and consequently may guide the movements of the cutter 14 as it moves through the work-piece 16. In the embodiment shown in FIG. 1, the cutting guide 12 includes a number of fingers 24 that interact with the guide surface 22 of the adjustable guidebush 10. Moving the cutter 14 in the recessed areas between the fingers 24 removes material from the end of work-piece 16 to define finger-joint elements 26. In other embodiments, however, guidebush 10 may be used in other manners and in conjunction with other cutting guides, to define other types of joint elements or otherwise guide a cutter with respect to a work-piece.

Figure 2:
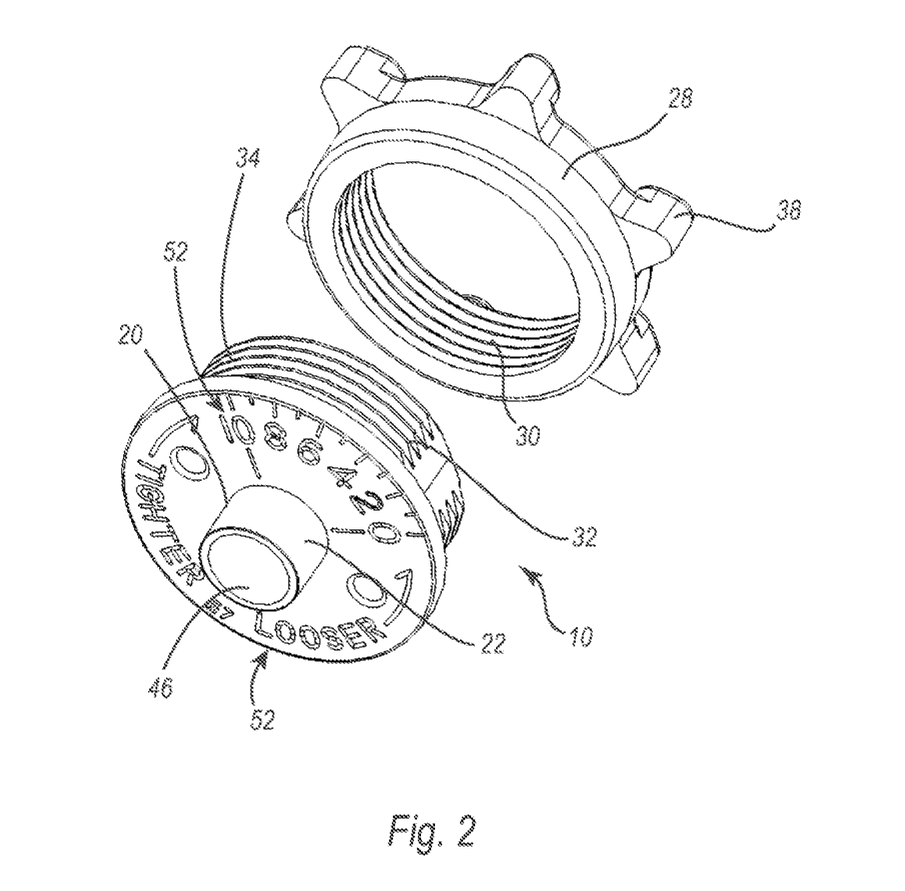
FIG. 2 is a perspective view of another embodiment of an adjustable guidebush.

The adjustable guidebush 10 may also include a positioning member that may facilitate positioning the guidebush 10 with respect to the router. For example, in the embodiment shown in FIG. 2, the positioning member 34 is externally threaded such that it may interact with corresponding threads 30 on a ring member 28. This adjustable guidebush 10 may be secured to a router base by passing the externally threaded surface 32 of the positioning member 34 through an opening in the muter base such that a flange of the positioning member 34 contacts an underside portion of the router base, and then threading the ring member 28 onto the threaded surface 32 until a lower surface of the ring member 32 contacts an upper surface of the router base, securing the guidebush 10 onto the router base. The ring member 28 shown in FIG. 2 includes thumb lugs 38 to help the user tighten the ring member 28.

Adjustable guidebushes of the present invention may be attached to cutting tools in other ways as well. For instance, in other embodiments, the router base may include a threaded aperture that interacts with external threads 32 of the guidebush 10. In still other embodiments, adjustable guidebush 10 may include structures or features other than external threads 32 for securing the guidebush 10 to the router base. In some embodiments; the guidebush 10 is not directly secured to the router base, but is secured to an adapter plate, which is in turn secured to the router base. In some embodiments, adjustable guidebush 10 is not attached to the router base, but is rather secured to other portions of the router or other cutting tool.

The manner in which the adjustable guidebush 10 is attached to the cutting tool is not necessarily important in all embodiments, although, in at least some embodiments, it may be desirable to secure the guidebush 10 such that it can be rotationally adjusted with respect to the cutting tool, for reasons discussed in further detail below.

Figure 3:
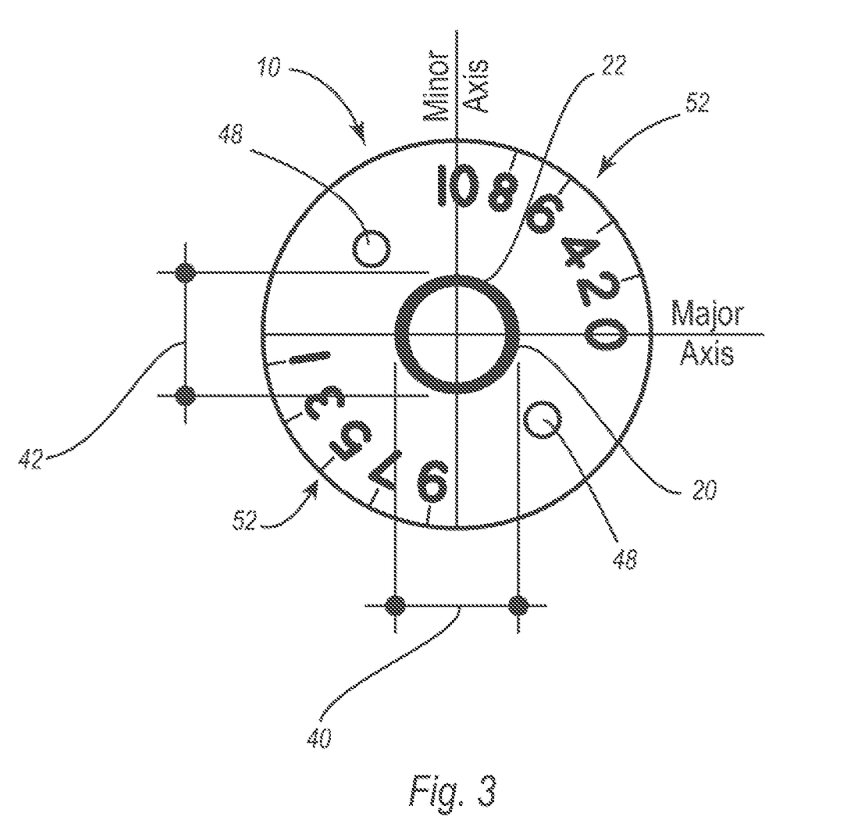
FIG. 3 is a bottom view of another embodiment of an adjustable guidebush.
Figure 5:
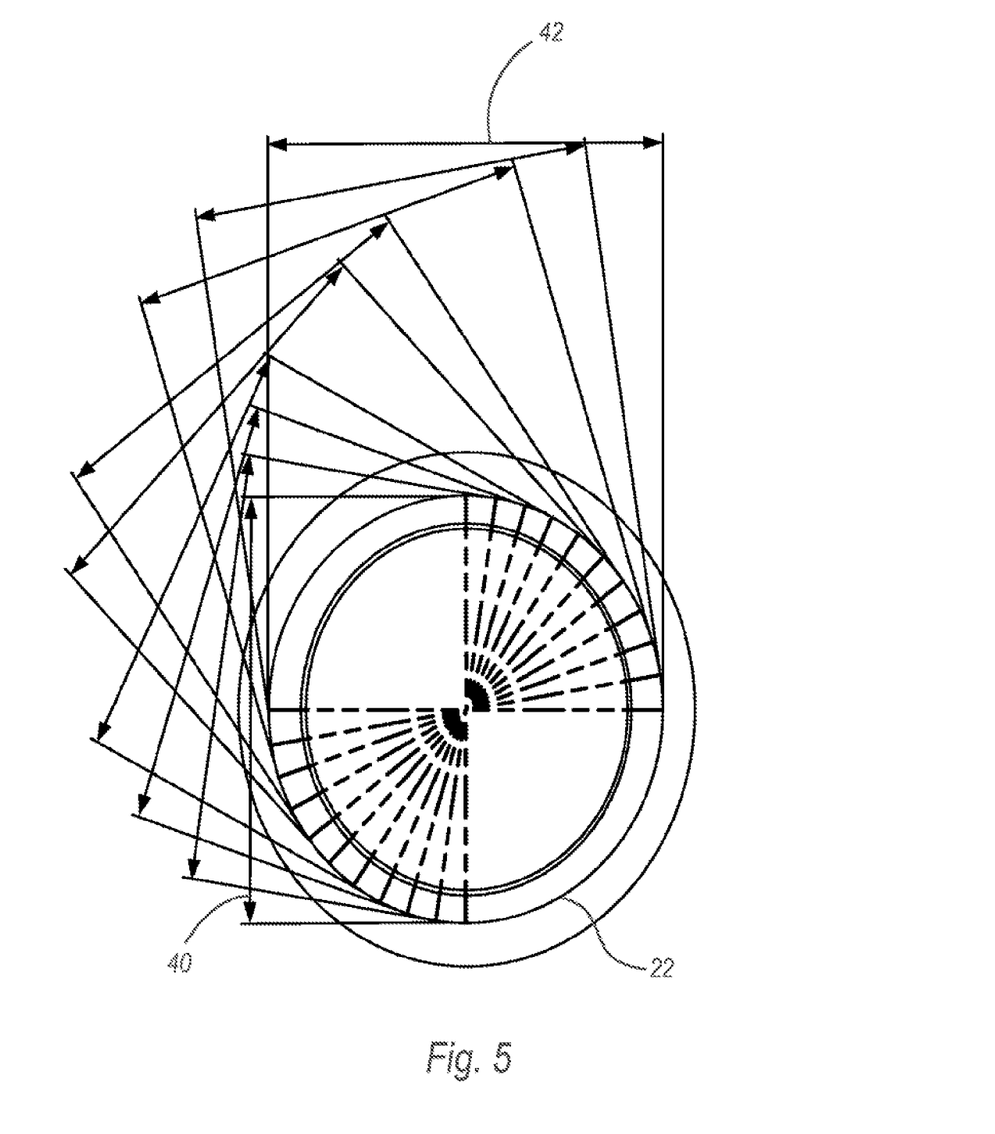
FIG. 5 is a schematic, not to scale, view of a portion of another embodiment of an adjustable guidebush.

FIG. 3 shows an embodiment of an adjustable guidebush 10 in which the outer guide surface 22 is at least somewhat non-circular. The outer guide surface 22 shown includes at least a first outer diameter 40 and a second outer diameter 42 that are different lengths to define an at least somewhat elliptical guide surface with the first outer diameter 40 defining the wider "major axis" of the ellipse and the second outer diameter 42 defining the shorter "minor axis" of the ellipse, which may be perpendicular to the major axis. The outer guide surface's elliptical shape may also define several other intermediate outer diameters that vary in length between the widest first outer diameter 40 and the shortest second outer diameter 42, such as shown by FIG. 5.

In some embodiments, at least one of the outer diameters of the guide surface 22 corresponds to a "standard" guidebush diameter (for example, without limitation, ⅜", 7/16", ⅝", ¾", etc. . . . ), and the other diameters of the guidebush represent at least slight deviations from the standard guidebush diameter, with the magnitude of the deviation increasing as the other diameters move away from the standard diameter. For instance, in the embodiment shown in FIG. 5, the guide surface 22 may have an outer diameter that varies between 0.0437 inches and 0.417 inches from the major axis to the minor axis. In the embodiments shown, the rate of change between the major and minor axes may be constant. For instance, the diameters between a major axis of 0.437 inches and a minor axis of 0.417 inches may decrease by 0.002 inches for every 9° the diameter is displaced from the major axis towards the minor axis. Other guidebushes of the present invention may feature other standard or non-standard outer diameters, which may or may not feature a constant rate of change between the first and second outer diameters.

The guide surface 22 shown in the FIGS. is at least somewhat elliptical in shape. In other embodiments, however, the guide surface may be other shapes that define at least two different outer diameters. For example, without limitation, guide surfaces could have a square, hexagonal, octagonal or other symmetric or asymmetric shapes.

Figure 4:
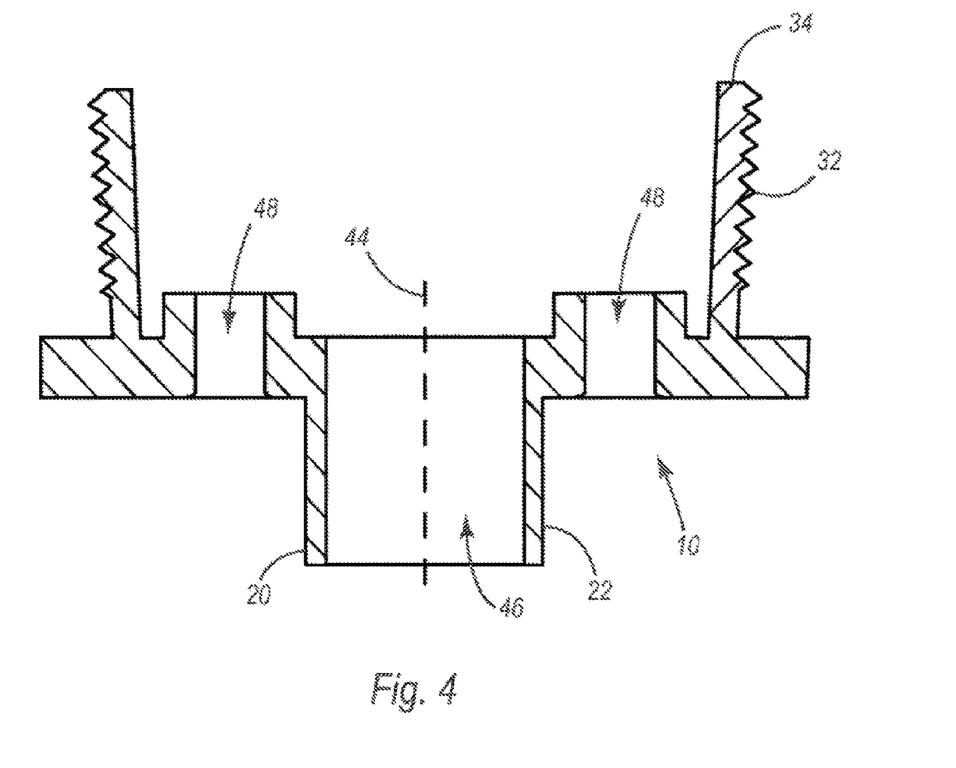
FIG. 4 is a schematic, not to scale, cross-section view of a portion of the adjustable guidebush of FIG. 2.

FIG. 4 shows a cross-section of an adjustable guidebush 10 and illustrates that the guide surface 22 is substantially parallel to the longitudinal axis 44 of the through-bore 46, through which a cutter extends when the guidebush 10 is installed in a router or other cutting tool.

FIG. 4 also shows that the adjustable guidebush 10 includes a pair of sockets 48. In this embodiment, the sockets 48 may receive a pin wrench 50 (shown in FIG. 7) or other tool to facilitate tightening the guidebush 10 onto the router base and/or adjusting the guidebush 10 after it has been installed onto the router, which is discussed in greater detail below. In some embodiments, the sockets 48 may include a slight chamfer to facilitate inserting the pin wrench or other tool. In other embodiments, adjustable guidebush 10 may or may not include sockets or other structures for tightening and/or adjusting the guidebush 10. In some embodiments, the adjustable guidebush 10 may be adjusted by hand, without the use of additional tools.

Figures 6, 7:
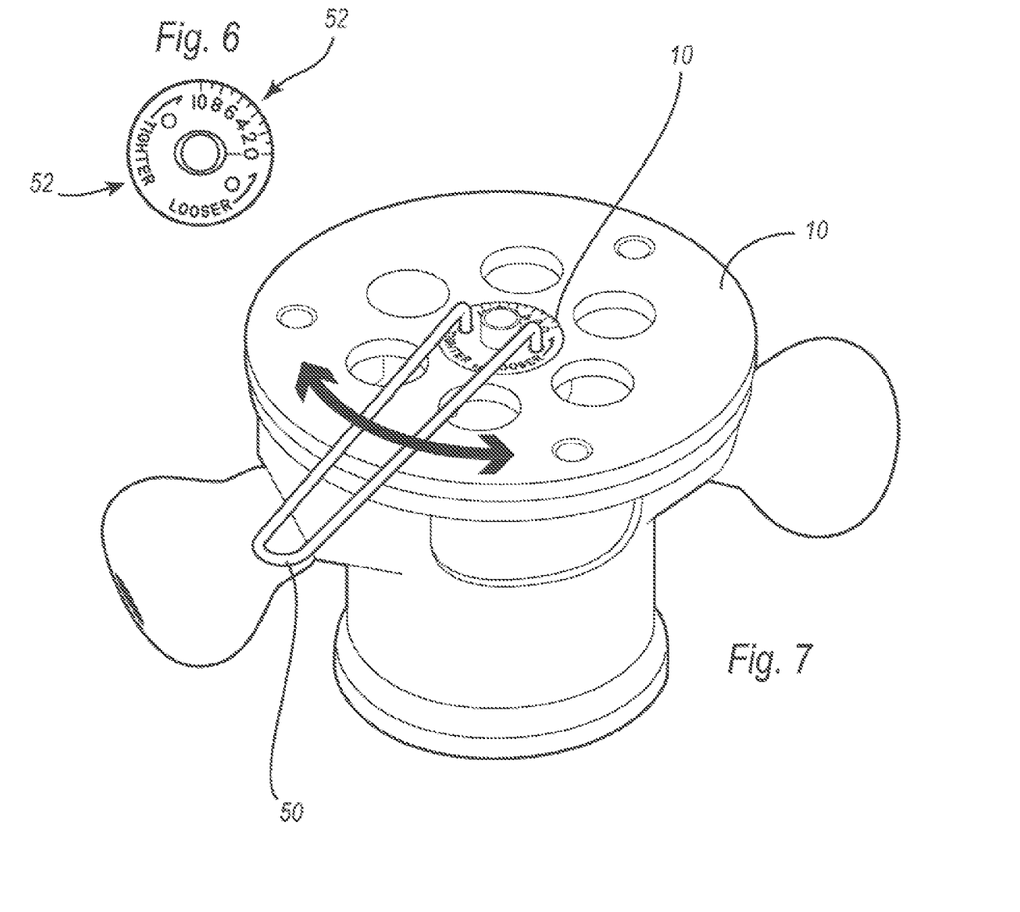
FIG. 6 is a bottom view similar to FIG. 3 of another embodiment of an adjustable guidebush.
FIG. 7 is the guidebush of FIG. 6 installed in the base of a cutting tool, and a tool for adjusting the position of the guidebush.

The adjustable guidebushes 10 shown in FIGS. 2-3 and 6-8 also include indicia 52 for indicating the rotational position of the guidebush 10 with respect to the router. The indicia numbers shown represent different outer diameters of the guide surface 22 such that a user can determine the outer diameter of the guide surface 22 that will contact the template 12 during the cutting operation. FIGS. 6-7 show a guidebush 10 that includes an alternative layout of indicia 52 along with an indication of which direction to rotate the guidebush 10 to adjust the fit of a joint to be either tighter or looser. FIG. 7 illustrates the adjustment of the guidebush 10 of FIG. 6 when it is mounted on a router.

Figure 8:
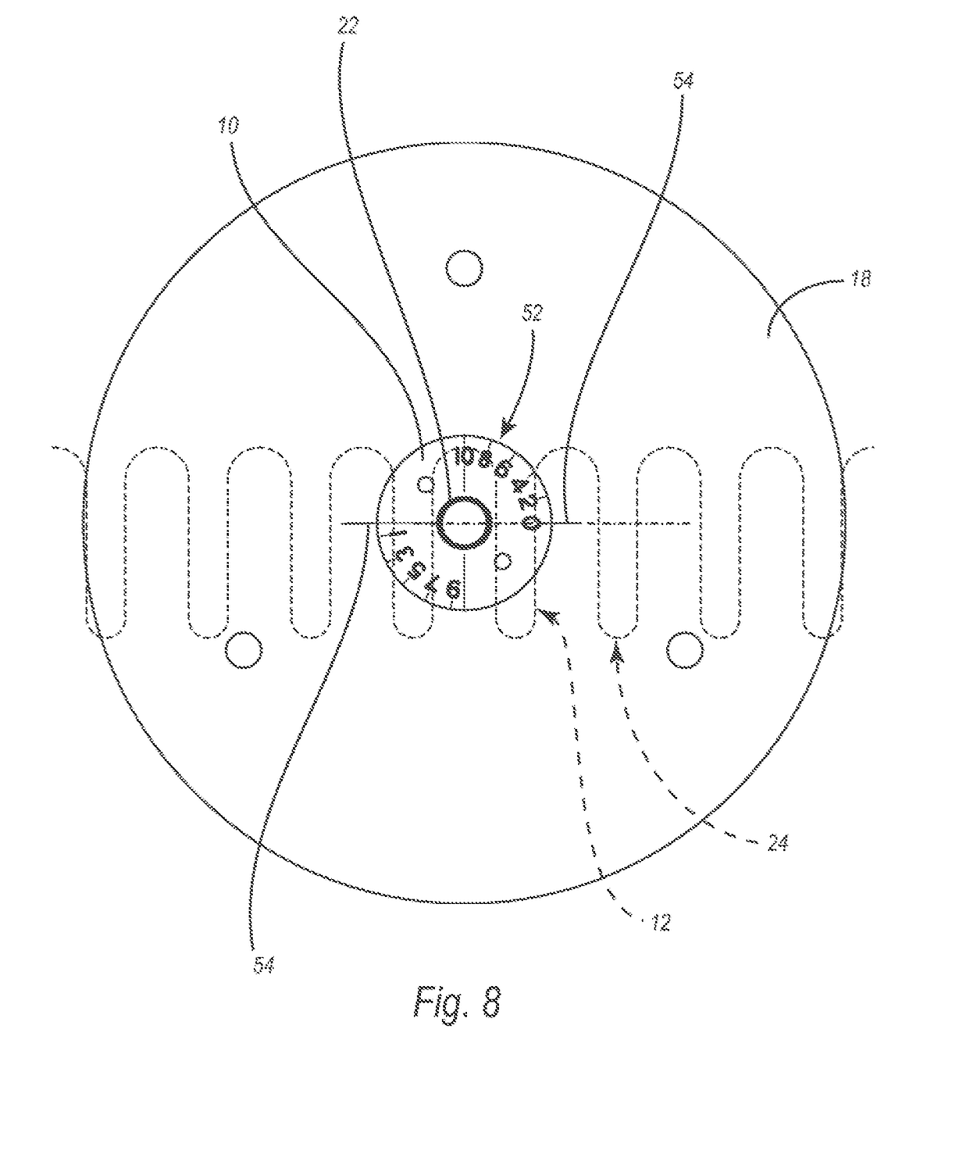
FIG. 8 schematically illustrates the adjustable guidebush of FIG. 2 installed in a base of a cutting tool.

FIG. 8 schematically illustrates the underside of an adjustable guidebush 10 installed in a router base 18 with respect to a cutting guide 12. As shown, the adjustable guidebush 10 has been positioned such that the indicia "0" is aligned with markings 54 in router base. In this embodiment, alignment with indicia "0" indicates that the widest outer diameter of the guidebush guide surface 22 is oriented to contact the guide fingers 24. This arrangement will create a relatively "tight" joint as the router's movements are guided by the interaction of the guidebush and cutting guide guide surfaces (22 and 12 respectively). Other indicia and marking systems are also possible and within the scope of this invention.

If the "0" setting of the guidebush 10 shown in FIG. 8 results in a joint that is too tight, the guidebush 10 may be adjusted for a looser fit by, in this embodiment, rotating the guidebush 10 (such as by using the pin wrench 50 shown in FIG. 7 or in another manner) to align the markings 54 with a higher numbered indicia 52. In the embodiment shown in FIG. 8, aligning a higher numbered indicia 52 with the marking 54 aligns a relatively narrower diameter of the guidebush guide surface 22 with the guide surfaces 12 of guide fingers 24, which will create an at least somewhat "looser" joint fit.

In some embodiments, it may be desirable to repeat this procedure multiple times before an ideal joint is achieved. In other embodiments, prior experiences or other knowledge may allow a desired joint fit to be achieved with few or even a single adjustment (or no adjustment at all) of the guidebush 10. For instance, without limitation, once an ideal joint is achieved, the setting of the adjustable guidebush may be recorded for use when forming future joints with the same guidebush, cutting tool and/or cutting guide.

In some embodiments, it may be desirable to hold the router (or other tool) in a relatively fixed orientation with respect to the template during the cutting operations for achieving consistent results (e.g. it may be desirable to hold the handles of the router such that they are perpendicular to the cutting guide guide fingers during the cutting operation). In other embodiments, the guidebush 10 is not adjusted by rotating it with respect to the router, but rather the entire router is rotated with respect to the cutting guide to change the effective diameter of the guidebush that is presented to the cutting guide.

Additions, deletions, substitutions or other modifications or changes may be made to the above described embodiments without departing from the scope or spirit of the present invention.

The invention claimed is:

1. A method for cutting a work-piece, comprising:
   (a) securing an adjustable guidebush to a cutting tool, the adjustable guidebush comprising a through-bore for receiving a portion of a cutter of the cutting tool and a guidebush guide surface that extends at least partially around the cutter, wherein:
      (i) a cross-section of the guidebush guide surface comprises at least a first outer diameter and second outer diameter;
      (ii) the first outer diameter is not substantially equal in length to the second outer diameter; and
      (iii) the through-bore defines a longitudinal axis and the guidebush guide surface is substantially parallel to the through-bore longitudinal axis;
   (b) at least temporarily positioning a cutting guide with respect to a work-piece; and
   (c) making a first cut in the work-piece with the cutter, wherein a first portion of the guidebush guide surface interacts with the cutting guide to guide the first cut, wherein the cross-section of the guidebush guide surface is perpendicular to the longitudinal axis of the through-bore.

2. The method of claim 1, further comprising:
   (a) rotating the guidebush guide surface with respect to the cutting guide; and
   (b) making a second cut in the work-piece with the cutter, wherein a second portion of the guidebush guide surface interacts with the cutting guide to guide the second cut.

3. The method of claim 2, wherein rotating the guidebush guide surface with respect to the cutting guide comprises rotating the guidebush guide surface with respect to the cutting tool.

4. The method of claim 2, wherein rotating the guidebush guide surface with respect to the cutting guide comprises rotating the cutting tool with respect to the cutting guide.

5. A method for cutting joint elements in wood work-pieces comprising:
   (a) making a first cut in a work-piece with a rotating cutter by guiding the work-piece relative to the rotating cutter with an adjustable guidebush, the adjustable guidebush comprising:
      (i) a guide member comprising a through-bore that at least partially receives the rotating cutter; and an outer guide surface that extends at least partially around the rotating cutter, the outer guide surface slidingly interacting with a cutting guide during the first cut;
      (ii) wherein a cross-section of the outer guide surface comprises at least a first outer diameter and a second outer diameter;
      (iii) wherein the first outer diameter is not substantially equal in length to the second outer diameter; and
      (iv) wherein the through-bore defines a longitudinal axis and the outer guide surface is substantially parallel to the through-bore longitudinal axis; and
   (b) adjusting the adjustable guidebush by rotating the adjustable guidebush,
      wherein the cross-section of the outer guide surface is approximately perpendicular to the longitudinal axis of the through-bore.

6. The method of claim 5, wherein making the first cut comprises guiding the rotating cutter with the cutting guide, the cutting guide comprising a plurality of fingers defining a plurality of recesses between the fingers; wherein the outer guide surface of the adjustable guidebush is positioned and configured to slidably interact with the fingers when a planar base of a router is placed on top of the cutting guide.

7. The method of claim 6, wherein making the first cut comprises making a box joint cut, a finger joint cut, a dovetail joint cut or a mortise and tenon joint cut.

8. The method of claim 6, wherein making the first cut comprises making a sliding dovetail joint cut.

9. A method for cutting joint elements in wood work-pieces comprising:
   (a) making a first cut in a work-piece with a rotating cutter by guiding the work-piece relative to the rotating cutter with an adjustable guidebush, the adjustable guidebush comprising a tubular guide member having an oval shape cross-section surrounding a portion of the rotating cutter;
   (b) adjusting the adjustable guidebush by rotating the adjustable guidebush,
      wherein the oval shape cross-section of the adjustable guidebush is perpendicular to a rotation axis of the rotating cutter.

10. The method of claim 2, wherein rotating the guidebush guide surface with respect to the cutting guide comprises rotating the guidebush guide surface about an axis that is parallel to the longitudinal axis.

11. The method of claim 2, wherein rotating the guidebush guide surface with respect to the cutting guide comprises a linear change in an outer diameter of a portion of the guidebush guide surface that interacts with the cutting guide.

12. The method of claim 5, wherein adjusting the adjustable guidebush comprises rotating the adjustable guidebush about an axis that is approximately parallel to the longitudinal axis.

13. The method of claim 5, wherein rotating the adjustable guidebush comprises a linear change in an outer diameter of a portion of a guidebush guide surface that interacts with the cutting guide.

14. The method of claim 13, wherein the linear change comprises a change of 0.002 inches for the outer diameter of the portion of the guidebush guide surface that interacts with the cutting guide for every 9° of rotation of the adjustable guidebush.

15. The method of claim 9, wherein rotating the adjustable guidebush comprises a linear change in an outer diameter of a portion of a guidebush surface that interacts with a cutting guide.

* * * * *